UNITED STATES PATENT OFFICE.

ROBERT E. SCHMIDT, OF ELBERFELD, GERMANY, ASSIGNOR TO THE FARBEN-FABRIKEN, VORMALS FR. BAYER & CO., OF SAME PLACE.

ALIZARINE DYE.

SPECIFICATION forming part of Letters Patent No. 476,419, dated June 7, 1892.

Application filed November 19, 1891. Serial No. 412,425. (Specimens.)

*To all whom it may concern:*

Be it known that I, ROBERT E. SCHMIDT, chemist, doctor of philosophy, residing at Elberfeld, Germany, (assignor to the FARBEN-FABRIKEN, VORMALS FR. BAYER & CO., at Elberfeld, Germany,) have invented a new and useful Improvement in the Manufacture of an Alizarine Dye-Stuff, of which the following is a clear and exact description.

My invention relates to the production of a new alizarine derivative suitable for dyeing by the action of ammonia upon the compound called "anthradiquinone," which is obtained when alizarine bordeaux is oxidized at low temperature in sulphuric-acid solution with manganese.

In carrying out my invention practically I proceed as follows: Ten kilos of alizarine bordeaux, described in my Letters Patent No. 446,893, dated February 24, 1891, are dissolved in two hundred kilos of sulphuric acid at 66° Baumé, and oxidized by twelve kilos of manganese, with the precaution that the temperature does not exceed 30° centigrade, as the oxidized product is easily decomposed at higher temperature. The mixture is then poured into ice-water, likewise avoiding any rise of temperature, and the separating anthradiquinone is filtered off, and quickly washed with ice-water till the washings begin to assume violet color. The anthradiquinone thus obtained is dissolved in about fifty kilos of ammonia liquid containing twenty per cent. of ammonia, and when the whole has been dissolved the resulting mixture is diluted with water, filtered, and then decomposed by the addition of acids in excess. In this manner a product results which, after having been filtered off, represents a dark-violet precipitate. It is almost insoluble in water. In sodium carbonate it dissolves with reddish violet, in soda-lye with indigo-blue color, and in ammonia liquid with bluish-violet color. By concentrated sulphuric acid it is dissolved with dark-violet color, and this color turns at first into red, then into reddish brown when the sulphuric-acid solution is mixed with cold water, and at last a reddish-brown precipitate is separated.

This new dye-stuff produces on wool mordanted with alumina salts blue shades of remarkable clearness and purity, while those on wool mordanted with chromium salts are greenish blue.

Having thus described my invention, I claim as new and desire to secure by Letters Patent—

1. The process hereinbefore described of producing a new alizarine dye-stuff by the action of ammonia upon the anthradiquinone formed when alizarine bordeaux is oxidized in sulphuric-acid solution with manganese at low temperatures.

2. The new dye-stuff which is almost insoluble in water, but soluble in solutions of sodium carbonate with a reddish violet, in soda-lye with indigo-blue color, and in ammonia liquid with bluish-violet color, and by concentrated sulphuric acid is dissolved with dark-violet color, which turns at first into red and then into reddish brown when diluted with water.

In testimony whereof I have signed my name in the presence of two subscribing witnesses.

ROBERT E. SCHMIDT.

Witnesses:
RUDOLPH FRICKE.
WM. ESSENWEIN.